(12) United States Patent
Sun et al.

(10) Patent No.: US 9,936,518 B2
(45) Date of Patent: Apr. 3, 2018

(54) METHOD FOR TRANSPORT BLOCK TRANSMISSION AND BLIND RECEPTION

(71) Applicant: MediaTek Singapore Pte. Ltd., Singapore (SG)

(72) Inventors: Feifei Sun, Beijing (CN); Xiangyang Zhuang, Lake Zurich, IL (US); Pei-Kai Liao, Nantou County (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 117 days.

(21) Appl. No.: 14/758,894

(22) PCT Filed: Jan. 14, 2014

(86) PCT No.: PCT/CN2014/070807
§ 371 (c)(1),
(2) Date: Jul. 1, 2015

(87) PCT Pub. No.: WO2014/111043
PCT Pub. Date: Jul. 24, 2014

(65) Prior Publication Data
US 2015/0341956 A1 Nov. 26, 2015

(30) Foreign Application Priority Data
Jan. 18, 2013 (CN) .......................... 2013 1 0019572

(51) Int. Cl.
*H04W 4/00* (2009.01)
*H04W 72/12* (2009.01)
(Continued)

(52) U.S. Cl.
CPC ....... *H04W 72/1289* (2013.01); *H04L 1/0046* (2013.01); *H04L 1/1861* (2013.01);
(Continued)

(58) Field of Classification Search
CPC ......... H04B 7/024; H04L 1/203; H04L 5/001; H04L 5/0035; H04L 5/0037;
(Continued)

(56) References Cited

U.S. PATENT DOCUMENTS

| | | | |
|---|---|---|---|
| 2004/0043784 A1 | 3/2004 | Czaja et al. | |
| 2011/0141901 A1* | 6/2011 | Luo ....................... | H04L 1/1822 370/241 |

(Continued)

FOREIGN PATENT DOCUMENTS

| | | |
|---|---|---|
| CN | 102170703 | 8/2011 |
| CN | 102215586 | 10/2011 |
| CN | 102404076 | 4/2012 |

OTHER PUBLICATIONS

International Search Report dated Mar. 27, 2014, issued in application No. PCT/CN2014/070807.
3GPP TS 36.213 version 9.0.1 Release 9; "Evolved Universal Terrestrial Radio Access (E-UTRA); Physical Layer Procedures;" pp. 1-81.

*Primary Examiner* — Harun Chowdhury
(74) *Attorney, Agent, or Firm* — Oblon, McClelland, Maier & Neustadt, L.L.P.

(57) ABSTRACT

A method for transport block transmission and blind reception is disclosed. The method is used in an UE and includes: receiving multiple candidate transport blocks, wherein each candidate transport block occupies a set of radio resources; and decoding the candidate transport blocks according to pre-defined encoding information to detect a potential transport block intended for the UE.

22 Claims, 13 Drawing Sheets

(51) Int. Cl.
*H04W 72/04* (2009.01)
*H04L 5/00* (2006.01)
*H04L 1/00* (2006.01)
*H04L 1/18* (2006.01)
*H04W 88/02* (2009.01)

(52) U.S. Cl.
CPC .......... *H04L 5/0001* (2013.01); *H04L 5/0053* (2013.01); *H04W 72/042* (2013.01); *H04W 88/02* (2013.01)

(58) Field of Classification Search
CPC ... H04L 5/0053; H04L 5/0091; H04L 1/0046; H04L 5/14; H04W 28/0268; H04W 52/50; H04W 72/042; H04W 72/1289
USPC ................ 370/281, 328, 329, 241, 252, 280
See application file for complete search history.

(56) References Cited

U.S. PATENT DOCUMENTS

| | | | |
|---|---|---|---|
| 2013/0176981 A1* | 7/2013 | Earnshaw | H04L 1/02 370/329 |
| 2013/0242890 A1* | 9/2013 | He | H04W 28/0268 370/329 |
| 2013/0301542 A1* | 11/2013 | Krishnamurthy | H04W 52/50 370/329 |
| 2013/0308504 A1* | 11/2013 | Nimbalker | H04L 5/001 370/281 |
| 2014/0301341 A1 | 10/2014 | Pan | |
| 2015/0003360 A1* | 1/2015 | Liu | H04L 5/001 370/329 |
| 2015/0043457 A1* | 2/2015 | Liu | H04B 7/024 370/329 |

\* cited by examiner

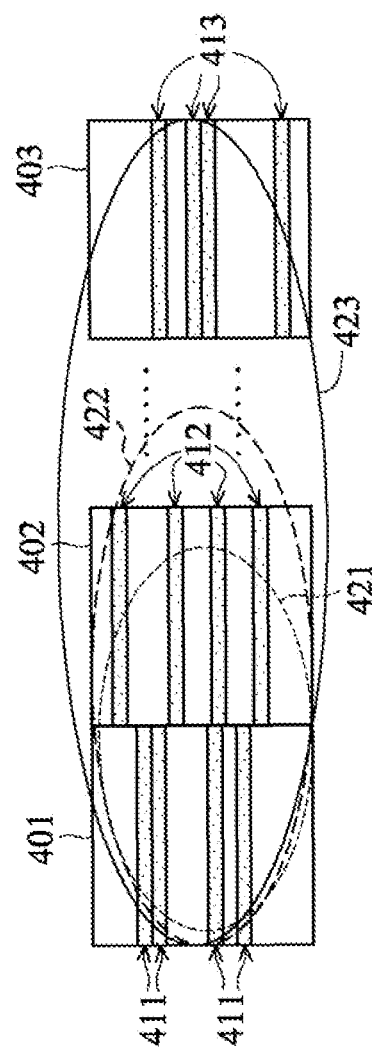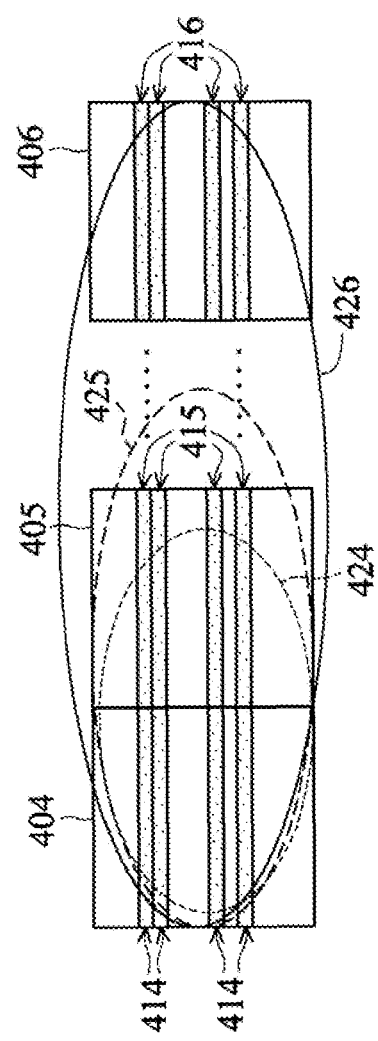

METHOD FOR TRANSPORT BLOCK TRANSMISSION AND BLIND RECEPTION

CROSS REFERENCE TO RELATED APPLICATIONS

This application is a National Stage application of PCT Application No. PCT/CN2014/070807, filed on Jan. 17, 2014, which claims the benefit of CN Application No. 201310019572.X filed 2013 Jan. 18 and entitled "METHODS FOR DATA CHANNEL TRANSMISSION AND BLIND RECEPTION". The entire contents of which are hereby incorporated by reference.

FIELD OF INVENTION

Aspects of the present invention relate generally to wireless communications systems, and more particularly to methods for transport block transmission and blind reception.

BACKGROUND OF THE INVENTION

With the increasingly mature M2M (Machine to Machine) market, the different requirements of M2M from H2H (human to human) causes attention by operators and standardization. In the 3rd generation partnership project (3GPP), from SA working groups to RAN working groups, there are some study items or working items ongoing to optimize the network architecture or air interface for the new requirements from M2M applications. A typical M2M application is a utility meter, wherein the terminals of the utility meter are fixed but have no access to a fixed line. And meter terminals are very often installed in the basements of residential buildings or locations shielded by foil-backed insulation, metalized windows, or traditional thick-walled building construction. As a result, how to provide coverage to this special case in a problem that needs to be solved. Therefore, a more efficient data transmission and reception method with reduced control signaling overhead is needed.

On the other hand, the typical traffic of an M2M application is small data. Some of the data traffic packet size of the M2M application is comparable with control signaling. For example, the typical traffic of metering is small data with relax delay (e.g. size of the order of 100 bytes/message in UL and 20 bytes/message in DL, and allowing latency of up to 10 seconds for DL and up to 1 hour in uplink, i.e. not voice). Therefore, signaling overhead shall be reduced in order to improve spectral efficiency. Therefore, the technique of transport block (e.g., PDSCH (Physical Downlink Shared Channel)) coverage enhancement but with lower signaling overhead is an important issue. The benefit of transport block transmission and reception technique is not limited to the examples above.

SUMMARY OF THE INVENTION

A detailed description is given in the following embodiments with reference to the accompanying drawings.

Methods and apparatuses for transport block transmission and blind reception are provided.

In one exemplary embodiment, the invention is directed to a method for decoding a transport block, used in an UE, comprising: receiving multiple candidate transport blocks, wherein each candidate transport occupies a set of data radio resources; and attempting to decode each candidate transport block to detect a potential transport block intended for the UE.

In one exemplary embodiment, the invention is directed to a method for decoding a transport block, used in an UE, comprising: receiving a first transmission of at least one candidate transport block, where each of the at least one candidate transport block occupies a first set of radio resources in a first subframe; receiving at least one repetition of the at least one candidate transport block, where each of the at least one candidate transport block occupies a second set of radio resources in at least one second subframe that is subsequent to the first subframe; and combining the first transmission and the at least one repetition of the at least one candidate transport block for decoding the at least one candidate transport block according to pre-defined encoding information to detect a potential transport block intended for the UE.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 4A~4B illustrate an example of an UE receiving and attempting to decode a candidate transport block.

DETAILED DESCRIPTION

Figure 1A:
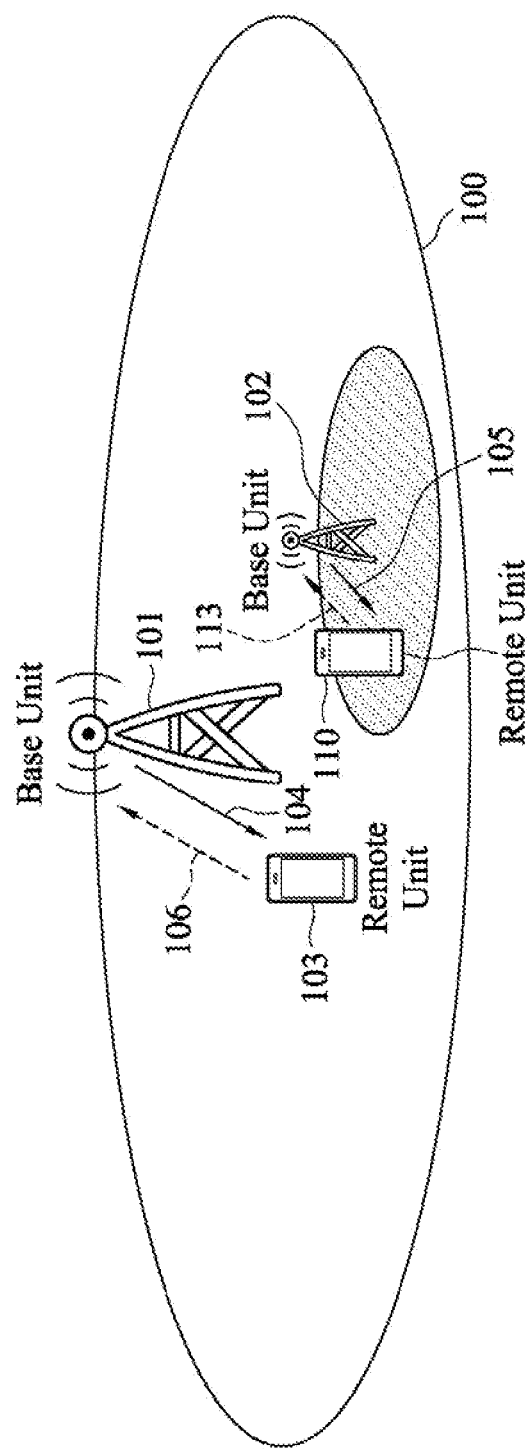
FIG. 1A illustrates a wireless communications system.
Figure 1B:
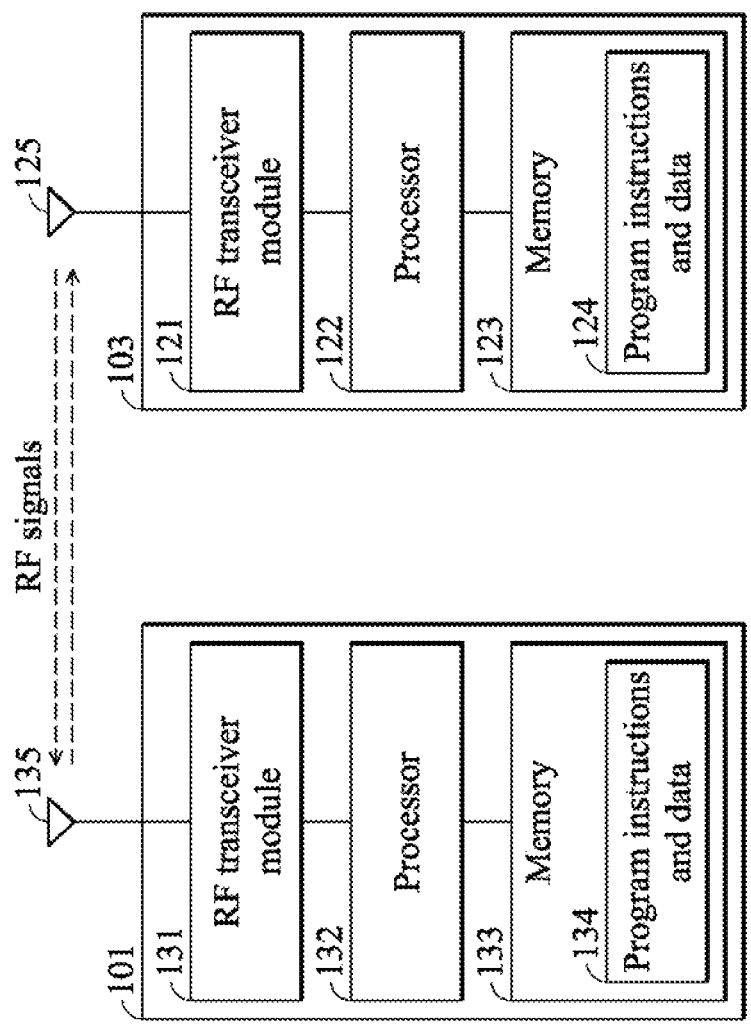
FIG. 1B is a block diagram of a base unit and a remote unit according to one exemplary embodiment.

Several exemplary embodiments of the present disclosure are described with reference to FIGS. 1 through 7C, which generally relate to a method for transport block transmission and blind reception. It is to be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

In FIG. 1A, the wireless communications system 100 includes one or more fixed base infrastructure units forming a network distributed over a geographical region. The base unit may also be referred to as an access point, access terminal, base station, Node-B, eNode-B, or by other terminology used in the art. In FIG. 1A, the one or more base units 101 and 102 serve a number of remote units 103 and 110 within a serving area, for example, a cell, or within a cell sector. In some systems, one or more base units are communicably coupled to a controller forming an access network that is communicably coupled to one or more core networks. The disclosure however is not intended to be limited to any particular wireless communications system.

Generally, the serving base units 101 and 102 transmit downlink communication signals 104 and 105 to remote units in the time and/or frequency domain. Remote units 103 and 110 communicate with one or more base units 101 and 102 via uplink communication signals 106 and 113. The one or more base units may comprise one or more transmitters and one or more receivers that serve the remote units as a RF transceiver module 131. The remote units may be fixed or mobile user terminals. The remote units may also be referred to as subscriber units, mobile stations, users, terminals, subscriber stations, user equipment (UE), user terminals, or by other terminology used in the art. The remote units may also comprise one or more transmitters and one or more receivers as a RF transceiver module 121. The remote units may have half duplex (HD) or full duplex (FD) transceivers. Half-duplex transceivers do not transmit and receive simultaneously whereas full duplex terminals do. FIG. 1A is a simplified block diagram of a remote unit 103 and a base unit 101 that support certain embodiments of the present invention. An antenna 125 transmits and receives RF signals. The RF transceiver module 121, coupled with the antenna 125, receives the RF signals from the antenna 125, converts them to baseband signals and sends them to a processor 122. The RF transceiver module 121 also converts the received baseband signals from the processor 122, converts them to the RF signals, and sends them to the antenna 125. The processor 122 processes the received baseband signals and invokes different functional modules to perform features in the remote unit 103. The memory 123 stores program instructions and data 124 to control the operations of the remote unit 103.

Similar configuration exists in the base unit 101 where an antenna 135 transmits and receives the RF signals. The RF transceiver module 131, coupled with the antenna 135, receives the RF signals from the antenna, converts them to baseband signals and sends them to a processor 132. The RF transceiver module 131 also converts the received baseband signals from the processor 132, converts them to the RF signals, and sends them to the antenna 135. The processor 132 processes the received baseband signals and invokes different functional modules to perform features in the base unit 101. The memory 133 stores program instructions and data 134 to control the operations of the base unit 101.

The remote unit and the base unit comprise functional modules, which carry out embodiments of the present invention. For example, the UL processing module and the DL processing module, and especially a decoding module for decoding multiple candidate transport blocks from the base unit to derive one or more potential transport blocks (not shown). The different functional modules can be implemented by software, firmware, hardware, or any combination thereof. For example, the function modules, when executed by the processors 122 and 132 (e.g., via executing program instructions 124 and 134), allow the remote unit 103 to receive multiple candidate transport blocks from the base unit 101, and attempting to decode each candidate transport block to detect a potential transport block intended for the remote unit 103, and to send ACK signal to the base unit 101, etc.

In one embodiment, the communication system utilizes OFDMA or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), DFT-spread OFDM (DFT-SOFDM) with IFDMA or LFDMA. In OFDMA based systems, remotes units are served by assigning downlink or uplink radio resources that typically consists of a set of subcarriers over one or more OFDM symbols. Exemplary OFDMA based protocols include the developing Long Term Evolution (LTE) of the 3GPP UMTS standard and IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, a communications system may utilize other cellular communication system protocols including, but not limited to, TDMA or direct sequence CDMA.

In 3GPP LTE system based on OFDMA downlink, the radio resource is partitioned into subframes each of which is comprised of 2 slots and each slot has 7 OFDMA symbols in the case of normal Cyclic Prefix (CP). Each OFDMA symbol further consists of a number of OFDMA subcarriers depending on the system bandwidth. The basic unit of the radio resource grid is called Resource Element (RE) which spans an OFDMA subcarrier over one OFDMA symbol. Each UE gets an assignment, i.e., a set of REs in a Physical Downlink Shared Channel (PDSCH), when there is a downlink transport block sent from base station to itself. The UE gets the downlink or uplink assignment information and other control information from a Downlink Control Information (DCI) on Physical Downlink Control Channel (PDCCH) or Enhanced Physical Downlink Control Channel (EPDCCH), whose content is dedicated to that UE. A UE needs to detect whether there is any its DCI on each subframe, by monitoring a set of PDCCH/EPDCCH candidates in the so-called "blind" PDCCH/EPDCCH decoding process. After successfully decoded its DCI, if the DCI indicates a downlink resource allocation of a PDSCH, the UE shall decode the PDSCH (transport block) based on the assignment. The modulation and coding scheme and redundancy version or other necessary information for decoding the PDSCH are also included in the DCI.

The main application scenario is MTC devices in poor coverage. For example, in RP-121441 and RP-121282, a 20 dB improvement in coverage in comparison to the coverage footprint engineered for "normal LTE UEs" can be needed for MTC devices under very low rate traffic with relaxed latency (e.g. size of the order of 100 bytes/message in UL and 20 bytes/message in DL, and allowing latency of up to 10 seconds for DL and up to 1 hour in uplink, i.e. not voice). In order to obtain 20 dB coverage gain under the same payload, around 100 times resources are needed, i.e., 100 times repetition. In LTE system, the smallest resource unit for transport block is one PRB (Physical Resource Block). Often it may not always be possible to do repetition on as large as 100 PRBs in frequency domain in a single subframe due to limited operation bandwidth. As a result, repetition of a transport block/data channel across multiple subframes is needed. Typical operation of using control channel to indicate the resource allocation of transport block, while allowing very flexible use of resources, may not be efficient if the control channel itself also requires repetitions. Therefore, transmitting transport block without control is desirable.

To support transmission of the transport block without control, a blind decoding concept for the transport block similar to that of PDCCH is adopted here. In one embodiment of the disclosure, a method for a UE to decode a transport block includes: receiving multiple candidate transport blocks, wherein each candidate transport block occupies a set of radio resources; attempting to decode the candidate transport blocks according to pre-defined encoding information to detect a potential transport block intended for the UE.

In the above method, the sets of radio resources corresponding to each candidate transport block are pre-defined and known to the UE. Moreover, the sets of radio resources for multiple candidate data channels are overlapping or non-overlapping. The candidate transport block is further comprised of one or more Transport Block Elements (TBEs) according to an aggregation level. In one embodiment, at least one transport block element of a candidate transport block may span at least one subframe. The number of subframes for the candidate transport block is configured by higher layer. The starting subframe is known to the UE. A transport block element is comprised of resource elements from a part of or an entire physical resource block (PRB). Alternatively, a transport block element is comprised of resource elements from multiple physical resource blocks.

The decoding attempt of each candidate transport block is based on pre-defined encoding information known to the UE, wherein the pre-defined encoding information includes a modulation and coding scheme. The transmission mode and/or transport block size (TBS) can be also included in the encoding information. In one embodiment, UE checks CRC by using scrambling sequence, which is also included in the pre-defined encoding information.

Note that the system information is also transmitted on the transport block. The potential transport block further includes system information. UE decodes the transport block carrying system information by checking CRC scrambled with a pre-defined RNTI, which is different from other data channel. Similar scheme can be adapted to transmit other common channels, such as Paging and RAR (Random Access Response).

In control channel, excluding grid information encoding information for the indicated transport block, there is some other control information. Without control channel, this other control information shall be further included in the potential transport block. The control information in the potential transport block is physical-layer related control information. The control information is a subset of a set of information that includes Sounding Reference Signal (SRS) request, TPC command, and Downlink Assignment Index (DAI). In addition, scheduling information of the uplink transmission may be also included in the transport block, such as resource block assignment, TPC command for scheduled for uplink transport block, cyclic shift for demodulation reference signal (DM RS) and orthogonal covering code (OCC) index, UL index, DAI, CSI Channel Status Indicator (CSI) request, and so on. In some cases such as uplink scheduling, the transport block may contain only control information for uplink. In order to distinguish the traffic data and the control information in a transport block, an indicator is also included in the transport block transmitting to UE. The control information is included in some pre-defined subframes.

If the potential transport block is successfully decoded, UE sends, on an uplink radio resource, an acknowledgment signal to a base station. The location of uplink radio resource is determined from the sets of radio resources on which the transport block is successfully decoded. Alternatively, the location of uplink radio resource is indicated in the decoded data channel.

Some further details are the above embodiments are given below.

Figure 2A:
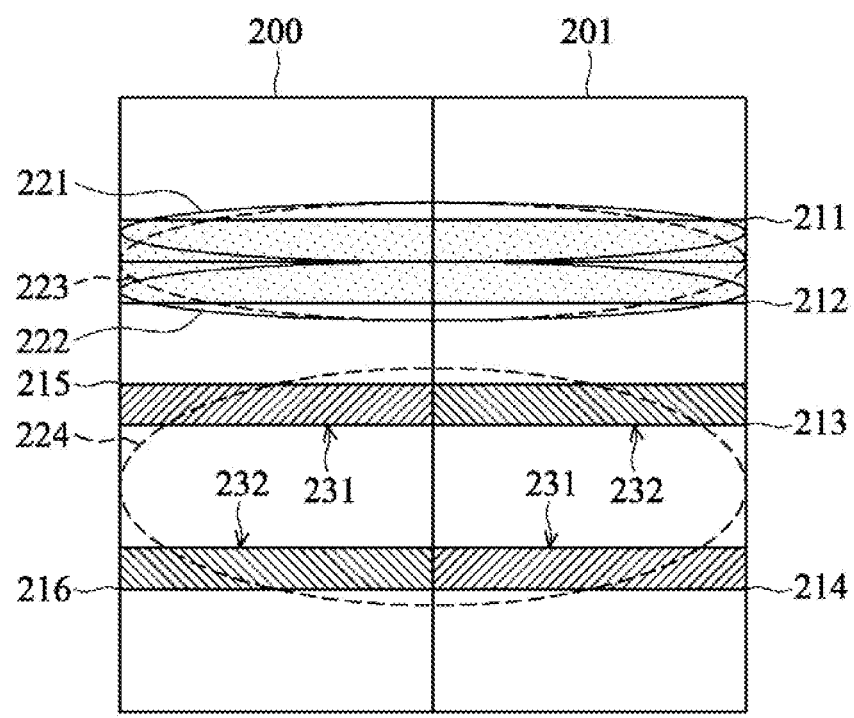
FIG. 2A illustrates an example of radio resources transmission.

Referring now to FIG. 2A, in one embodiment of the disclosure, a method for a UE to decode a potential transport block includes: receiving multiple candidate transport blocks, wherein each candidate transport block (221, 222, 223, 224) occupies a set of radio resources (211, 212, 213, 214, 215 and 216); attempting to decode each candidate transport block (221, 222, 223 and 224) to detect a potential transport block intended for the UE.

A radio resource consists of a set of resource elements. One type of radio resource in LTE is called physical resource block (PRB) as shown in 213, 214, 215 and 216, each of which contains several consecutive OFDM symbols in time domain and several consecutive subcarriers in frequency domain. Virtual resource blocks (VRB) is another radio resource definition in LTE system, which have two types: localized type and distributed type. For each type of virtual resource blocks, a pair of virtual resource blocks over two slots (200, 201) in a subframe is assigned together by a single virtual resource block number. For example, two PRBs (214 in slot 201, 215 in slot 200) in 231 can be considered as a pair of virtual resource blocks. In one embodiment, a transport block element can be defined as one PRB, or one VRB or a pair of VRB. Alternatively, a transport block element is comprised of multiple PRBs.

The sets of radio resources corresponding to each candidate transport block (221, 222, 223 and 224) are pre-defined and known to the UE. The sets of radio resources occupied by the multiple candidate data channels are overlapping (e.g., the candidate set 221 and 223 are partial overlapping) or non-overlapping (e.g., the candidate set 221 and 222 are non-overlapping). Each candidate transport block is further comprised of an aggregation of one or more transport block elements according to the aggregation level. For example, the candidate transport block 221 or 222 is comprised of one transport block element and candidate transport block 223 or 224 is comprised of an aggregation of two transport block elements, where transport block element is defined as a pair of VRB. With the definition of transport block element as one PRB, candidate transport block 221 and 222 correspond to an aggregation level of two, and candidate transport block 223 and 224 correspond to an aggregation level of four. The sets of radio resources for candidate data channels can be localized (e.g., the candidate transport block 221, 222 and 223) or distributed (e.g., the candidate transport block 224).

Figure 2B:
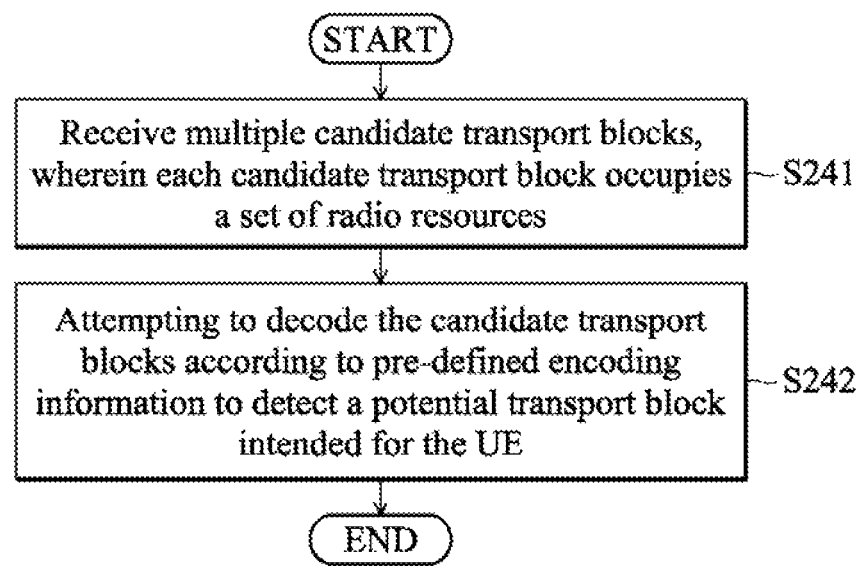
FIG. 2B is a signaling flow diagram according to one exemplary embodiment.

FIG. 2B is an embodiment of a method flow chart for decoding a transport block. In step S241, the UE receives multiple candidate transport blocks, wherein each candidate transport block occupies a set of radio resources. In step S242, the UE further attempts to decode the candidate transport blocks according to pre-defined encoding information to detect a potential transport block intended for the UE.

Figure 3:
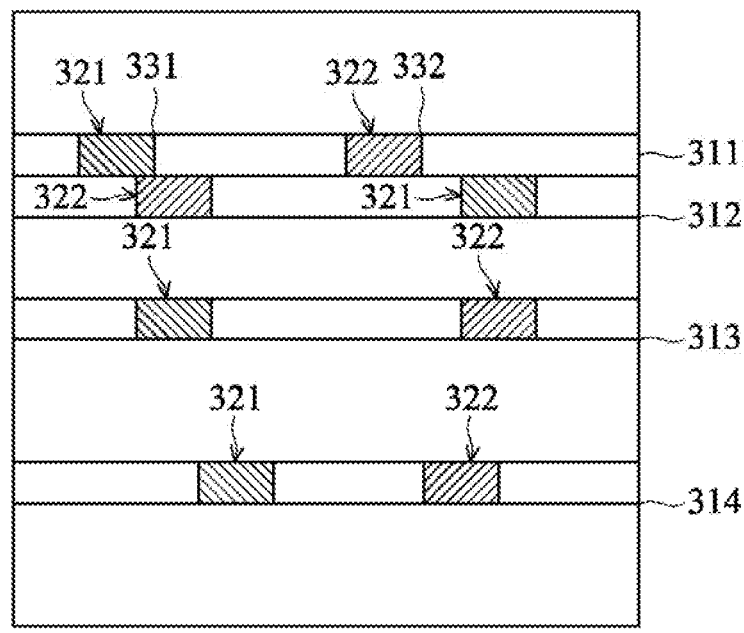
FIG. 3 illustrates an example of a transport block element.

Referring to FIG. 3 where another embodiment of transport block element (TBE) is shown. Each transport block element (e.g., the transport block element 331, 332) is comprised of resource elements in a part of or an entire physical resource block (PRB). Alternatively, each transport block element (e.g., the transport block element 321 or 322) is comprised of resource elements (REs) in multiple physical resource blocks (e.g., the PRBs 311, 321, 313 and 314). In one embodiment, a transport block element (TBE) can be a control channel element (CCE) in LTE system, each of which contains a set of distributed REs in a control region (up to first three OFDM symbols). Alternatively, a transport block element is an enhanced CCE (ECCE), and each of ECCEs contains REs from one or more pairs of PRBs. For example, the transport block element 331 or 332 can be an ECCE, and the REs in the transport block element 331 or 332 are from one PRB 311. In another example, the transport block element 321 or 322 can be an ECCE and the REs in the transport block element 321 or 322 are from different PRBs 311, 312, 313 and 314. In one embodiment, a base station can multiplex TBEs and CCE/ECCE together. In other words, a PRB or a VRB/PRB pair can contain ECCE and TBE simultaneously. For an UE, which is configured blindly decode for data channel, the UE can follow the control channel decoding rule to attempt decoding data channel.

Referring to FIG. 4A, an UE receives candidate transport block (421, 422, 423), where each candidate transport block contains transport block elements (411, 412 and 413) across multiple subframes (401, 402 and 403). For example, in FIG. 4A, the candidate transport block 421 contains transport block elements 411 in subframe 401 and transport block elements 412 in subframe 402. Similarly, referring to FIG. 4B, an UE receives candidate transport blocks (424, 425 and 426). In another example in FIG. 4B, the candidate transport block 424 contains the transport block elements 414 in subframe 404 and the transport block elements 415 in the subframe 405. Both candidate transport block 421 in FIG. 4A and 424 in FIG. 4B are contains the transport block elements across multiple subframes. The transport block elements in different subframes are the same (e.g., the transport block elements 414 in the subframe 404 and the transport block elements 415 in the subframe 405 are the same); alternatively, the transport block elements in different subframes are different (e.g., the transport block elements 411 in the subframe 401 and the transport block elements 412 in the subframe 402 are different). The UE attempts to decode each candidate transport block to detect a potential transport block intended for the UE after receiving the radio resources.

Whether the transport block elements occupy multiple subframes is configured by higher layer. For the above across-subframe transmission of transport block, the potential starting points (i.e., subframes) should be known to the UE. The set of valid starting subframes can be pre-defined or follows some predefined rule, for example, based on its user ID (e.g., RNTI) or SFN. In another example, the starting subframes only occur at the first subframe of every 10 ms radio frame. The set of radio resources in the frequency domain in each subframe (a set of candidate locations) are also known to the UE, and may also base on, for example, its user ID (e.g., RNTI).

In a particular example, a simple repetition is used in multiple subframes instead of incremental redundancy, so that the UE can simply combine the radio resources from the multiple subframes. The direct signal accumulation over subframes can be performed. Therefore, the simple repetition also reduces the requirement of the data buffer size for the UE. The frequency domain aggregation may be executed first, and then the repetition across subframes is after the maximum aggregation level in frequency domain is achieved. Take FIG. 4B as an example, four transport block elements in 414 are aggregated as the maximum aggregation level in frequency domain. However, if this maximum aggregation level in frequency domain cannot provide enough coverage, the radio resources in time domain will be further aggregated, i.e., the repetition across multiple subframes. For example, additional transport block elements 415 and 416 in the subframe 405 and 406 are aggregated as a candidate transport block.

The set of candidate transport blocks to monitor are defined according to search spaces. The search space may be pre-defined for the UE which needs to blindly decode candidate transport block, similar to PDCCH/EPDCCH blind decoding. The blind decoding requirement can be defined for each aggregation level. The UE may not need to monitor all the aggregation levels. Table 1 shows an example of the blind decoding number for every aggregation level. Three cases are defined in the Table 1. The UE can be configured to monitor one of these cases according to some pre-defined rules. In one example, the UE can indicate the blind decoding number to the base station by choosing a PRACH preamble based on the estimated path loss. In another example, the blind decoding number of each aggregation level indicated by the UE can be configured by higher layer.

As mentioned above, the aggregation can span both frequency and time. There may be a maximum aggregation level in frequency domain. For example, the aggregation levels smaller than 8 (including 8) may be within one subframe and the aggregation levels larger than 8 may be across multiple subframes. The aggregation levels 16, 32, 64 and 128 are across 2, 4, 8, 16 subframes, respectively. For the UE in a coverage hole, the coverage requirement cannot be achieved by the resource within one subframe. In this case, only one aggregation level can be in frequency domain (e.g., the maximum aggregation level in the frequency domain). In a particular case, the radio resources in one subframe can be "dedicated" to an UE (the UE knows the radio resources if there is any candidate transport block transmitted to the UE). The UE still needs to blindly decode the time domain aggregation level or repetition.

TABLE 1

An example of blind detection time of each aggregation level

| | Aggregation Level | | | | | | |
|---|---|---|---|---|---|---|---|
| | 1 | 2 | 4 | 8 | 16 | 32 | 64 | 128 |
| Case 0 | 8 | 16 | 16 | 8 | — | — | — | — |
| Case 1 | — | — | 8 | 16 | 16 | 8 | — | — |
| Case 2 | — | — | — | — | 8 | 16 | 16 | 8 |

In another embodiment, the time aggregation level can be defined separately from the frequency aggregation level. When the repetition is used, the same modulation symbols are retransmitted on the same REs in different subframes. The UE simply combines multiple candidate sets of radio resources from multiple subframes. The UE can attempt to decode the candidate transport blocks after accumulating each subframe. Alternatively, the UE can only attempt to decode the candidate transport blocks at certain pre-defined repetition levels, for example, at {2, 4, 8, 16, 32, 64, 128}. The set or a subset of the pre-defined repetition levels can be determined by the UE based on the estimated path loss. Alternately, the set of the pre-defined repetition levels can be configured by higher layer.

Figure 4C:
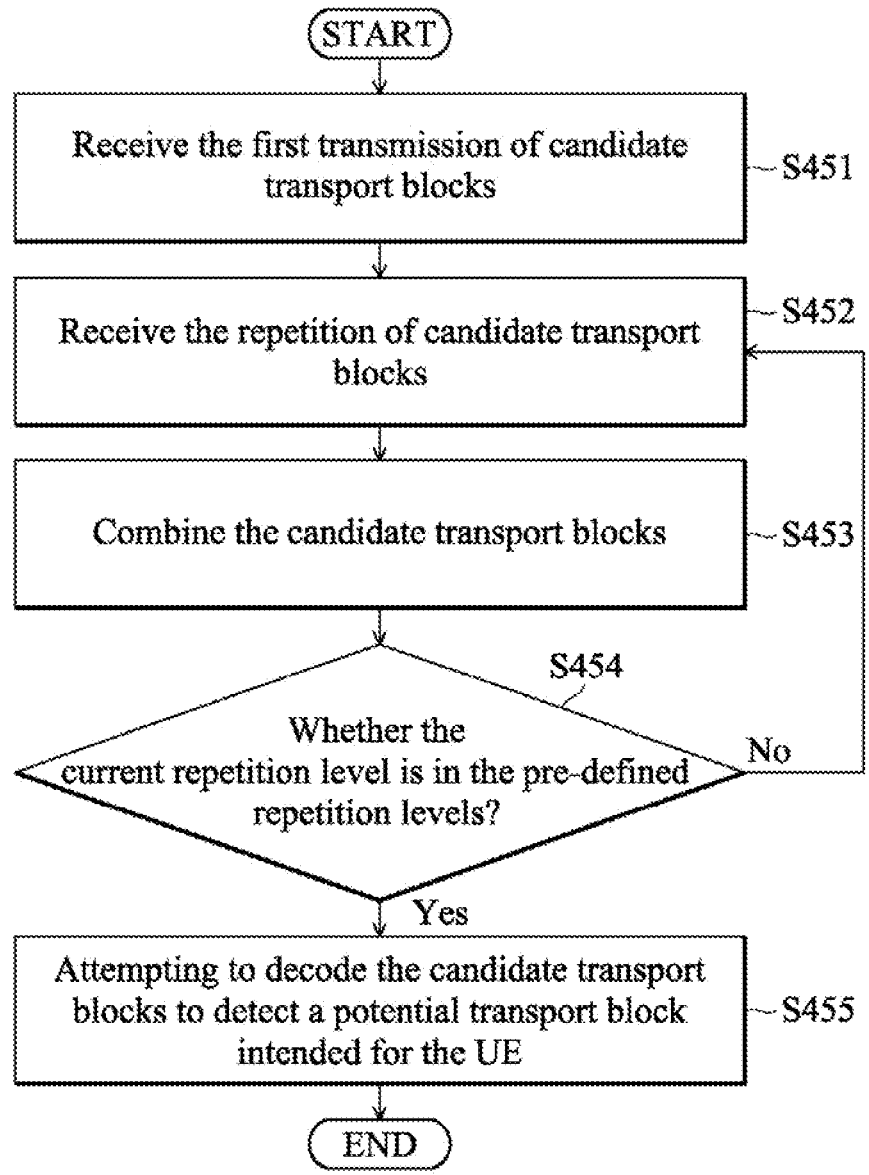
FIG. 4C is a flow chart according to one exemplary embodiment.

FIG. 4C is a flow chart according to one exemplary embodiment. In FIG. 4C, first, the UE receives the first transmission of candidate transport blocks in step S451. Then, the UE receives the repetition of the candidate transport blocks in step S452. In step S453, the UE combines the candidate transport blocks. Next, the UE determines whether current repetition level is in the pre-defined repetition levels in step S454. If the UE determines the current repetition level is in the pre-defined repetition levels ("Yes" in step S454), in step S455, the UE decodes the candidate transport blocks to detect a potential transport block intended for the UE. Otherwise, the steps return to step S452 to continue the processing flow.

The UE will attempt to decode the candidate transport blocks in its search space. Once the potential transport block is successfully decoded, The UE sends, on an uplink radio resource, an acknowledgment signal to a base station. The location of the uplink radio resource is determined according to the sets of the radio resources on which the transport block is detected. For example, the physical uplink control channel (PUCCH) for the ACK signal resource is used for transmission of the corresponding transport block assignment by using a parameter configured by higher layer plus the number of the first TBE (i.e. the lowest TBE index used to construct the transport block). For example, the PUCCH for the ACK signal resource $n_{PUCCH}$ can be defined as follows:

$$n_{PUCCH} = n_{DCE} + N_{PUCCH}^{(1)} \quad (1)$$

where $N_{PUCCH}^{(1)}$ is a cell-specific offset providing the starting point of the PUCCH resources provided by higher layer and $n_{DCE}$ is the first TBE of the detected transport block in the search spaces.

Alternatively, the location of the uplink radio resource for the ACK transmission is indicated in the decoded transport block. For example, the transport block can also contain the control information used to indicate the uplink resource for the UE to transmit the ACK signal. The control information may include one or several of the following information: the subframe, the resources, and code sequence used to transmit the ACK signal. Alternatively, an additional offset can be provided to avoid collision with other UEs. For example, $$n_{PUCCH} = n_{DCE} + N_{PUCCH}^{(1)} + ARI,$$

wherein ARI is a PUCCH offset. For example, 2-bit ACK resource indicator (ARI) can map to PUCCH resource offset values of −2, −1, 0, and 1.

Figure 5A:
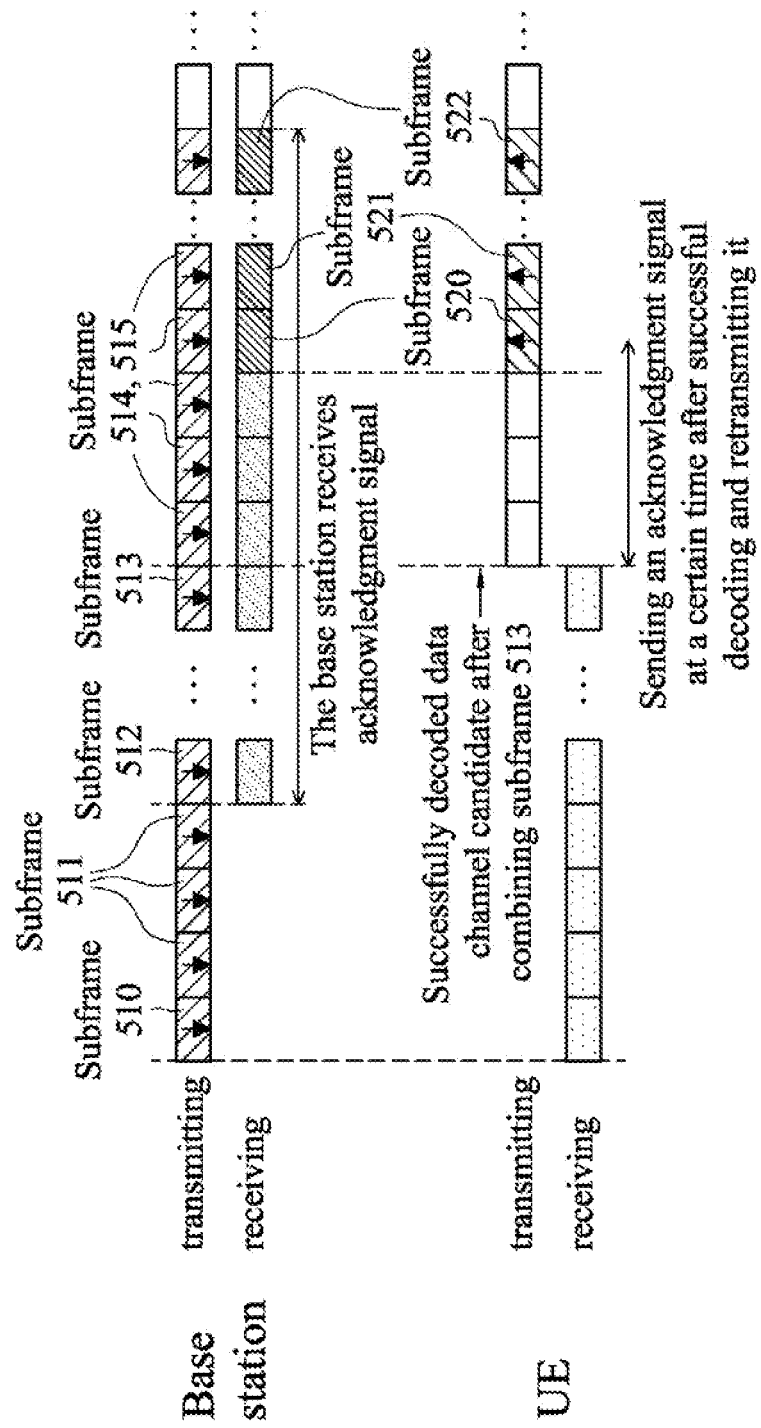
FIG. 5A illustrates an example of the acknowledgment signal (re)transmission and reception.

In one particular embodiment, the transport block signal cannot be changed during the repetition, but the UE may successfully decode the transport block before the end of the retransmission. In this case, the base station may allow the UE to acknowledge the transport block reception. Referring to FIG. 5A, the UE can send an acknowledgment signal to the base station if the UE can successfully detect the transport block. The transport block is transmitted first on the subframe 510 and then retransmitted on the subsequent subframes 511, 512, 513, etc. The UE starts to receive from the subframe 510 and attempts to decode the candidate transport block at certain subframes. For example, the UE attempts to decode the candidate transport block after receiving and combining the signal in each subframe 510, 511, 512, and 513. After combining the first transmission and the subsequent retransmissions before the subframe 513, the UE successfully detects the transport block and starts to send an acknowledgment signal on the subframe 520 with or without any predefined waiting time. Due to the high path loss, the UE may need to retransmit the acknowledgment (ACK) signal on multiple subframes 521 and 522. In order to allow the base station to combine the ACK signal transmissions, the property (e.g., location of the occupied resources) of the ACK signal may be known to the base station. In one example, the same resources in each subframe are used to allow the base station to accumulate the received signal. In one example, the UE may retransmit the ACK signal with the same number of times of the repetition as required to successfully detect the transport block.

Since the base station does not know when the UE can successfully detect the control channel and send an acknowledgement (ACK) signal, the base station may start receiving the ACK signal on a predefined resource from a certain subframe no matter whether the UE sends the ACK signal. In FIG. 5A, the base station starts receiving the acknowledgement signal from the subframe 512. The maximum ACK transmission number also needs to be known to both the UE and the base station. In LTE, the ACK signal shall be sent at the fourth subframe after the subframe sending a physical channel, as shown in FIG. 5A. In another embodiment, the UE cannot successfully detect the transport block before the subframe 513, therefore no ACK signal is received on the assigned resource before the subframe 520. Note that before the ACK signal is successfully detected, the base station may retransmit the potential transport block in the subframes 514, 515 and so on until the ACK is successfully detected or a maximum number of the retransmission is reached.

Figure 5B:
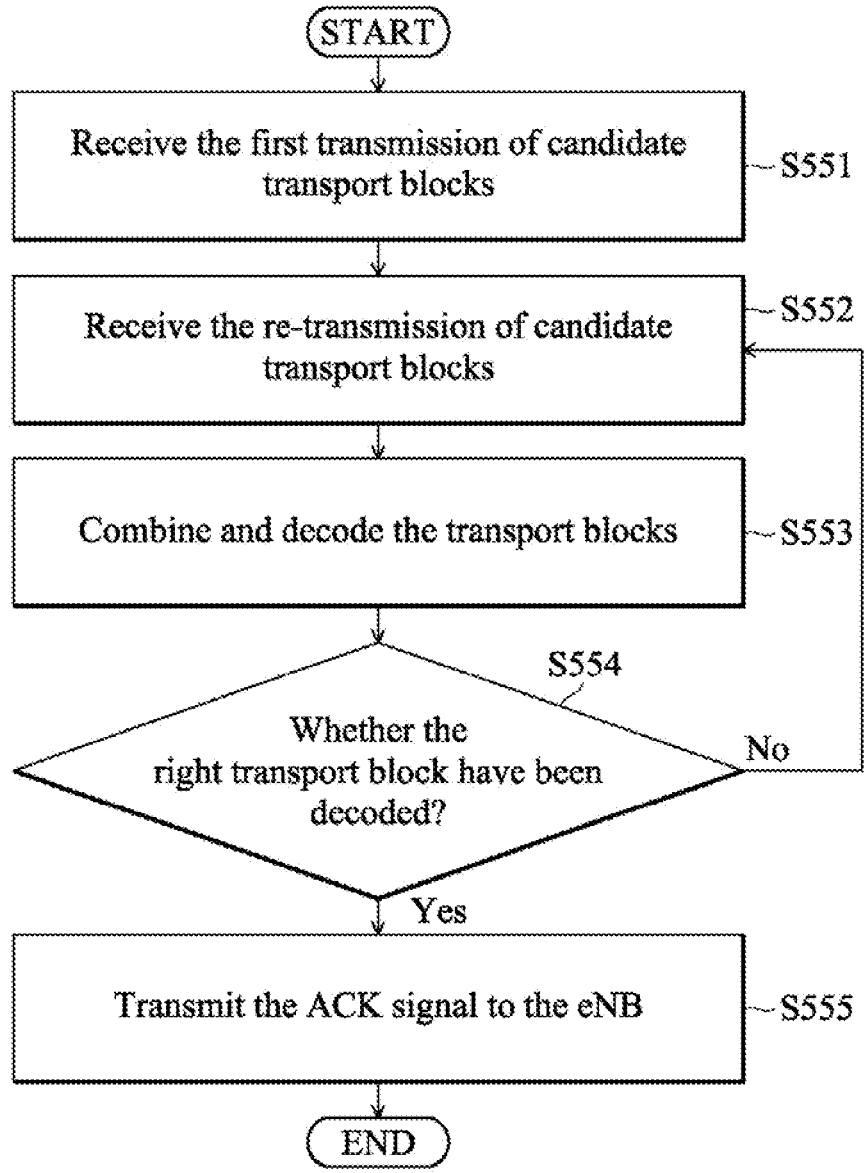
FIG. 5B is a chart flow diagram according to one exemplary embodiment

FIG. 5B is a flow chart according to one exemplary embodiment. In FIG. 5B, first, the UE receives the first transmission of candidate transport blocks in step S551. Then the UE receives the re-transmission of the candidate transport blocks in step S552. In step S553, the UE combines and decodes the transport blocks. Next, the UE determines whether the right transport block have been decoded in step 554. If the UE determines the right transport block has been decoded ("Yes" in step S554), in step S555, the UE transmits the ACK signal to the eNB. Otherwise, the steps return to step S552 to continue the processing flow.

Figure 6:
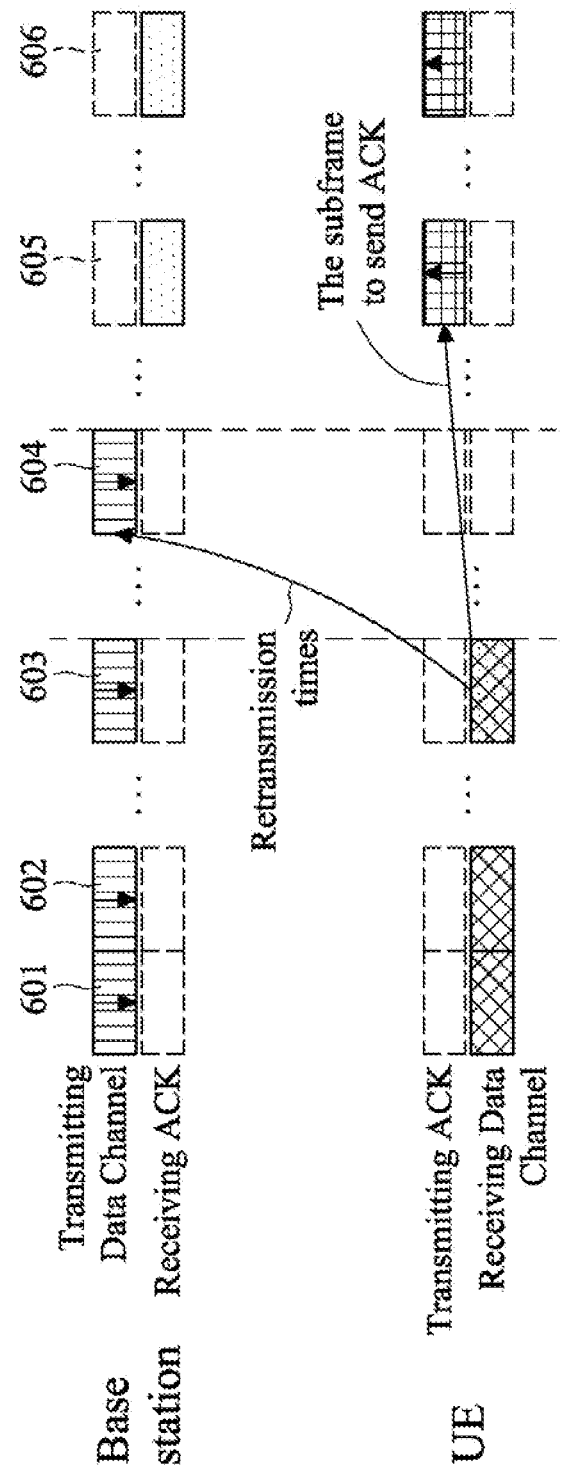
FIG. 6 illustrates an example of the acknowledgement signal (re)transmission and reception.

In another embodiment, the behavior "early-detection" of the UE can also be defined in the transport block. The base station can send the ACK signal after all the retransmissions. The number of the ACK retransmissions can be explicitly or implicitly included in the transport block. Referring to FIG. 6, the base station starts to transmit a transport block to the UE from the subframe 601 and retransmits the transport block in the subframes 602, 603, and 604. The UE starts to receive the candidate transport block and attempts to decode the candidate transport block from the subframe 601 and successfully decodes the transport block in the subframe 603. According to the control information in the successful decoded transport block, the UE obtains the information about how to send an ACK signal. The information can be indicated explicitly or implicitly. For example, the control information in the transport block may contain the uplink resource for the UE to transmit the ACK signal, wherein the ACK signal may include one or several of the following information: the subframe, the resources, and the code sequence for transmitting the ACK signal. In another example, the information can be indicated implicitly, such as the transport block element index implies the ACK resource index. The number of the retransmission can also be obtained by the UE explicitly or implicitly. For example, the UE can know that the base station transmits the transport block from the subframe 601 to the subframe 604. With known the number of retransmission, the UE can follow a pre-defined rule to send the ACK signal, for example, in LTE system, the UE sends the ACK signal after the fourth subframe which is after the transport block reception and the UE retransmits the ACK signal for the number of times which is same as the number of times of the retransmission of transport block.

Note that transport block can either be decoded successfully (the ACK signal is send) or not be detected which results in a no transmission (i.e., DTX). There is no NACK signal in this case. In this case, only one state needs to be transmitted. As a result, a simple modulation can be used, for example, the ACK signal uses the on-off keying (OOK) modulation and the ACK signal is carried by the presence transmission. Compared with 1-bit ARQ in LTE system using the BPSK modulation, the OOK modulation can have better coverage.

As mentioned above, the transport block can contain not only the data traffic, but also the physical-layer related control information control information, such as a Sounding Reference Signal (SRS) request, TPC command, Downlink Assignment Index (DAI) and so on. In addition, the scheduling information of the uplink transmission may be also included in the transport block, such as a resource block assignment, TPC command used for scheduling the uplink transport block, cyclic shift for demodulation reference signal (DM RS) and orthogonal covering code (OCC) index, UL index, DAI, CSI Channel Status Indicator (CSI) request, and so on. Moreover, the uplink radio resources allocated for the ACK may be also included in the transport block. In some cases such as the uplink scheduling, the transport block may contain only control information for uplink. In order to distinguish the traffic data and the control information in a transport block, an indicator is also included in the transport block transmitting to the UE. The control information is included in some pre-defined subframes.

In order to blindly detect the candidate transport block, some information should be pre-defined for the UE. For example, the UE may need to know the search space. Some examples have been given above. The UE may attempt to decode each pre-defined search space for the candidate transport block. The UE checks CRC after decoding the pre-defined search space in order to check whether the candidate transport block has been successfully decoded. The CRC is scrambled with a pre-defined sequence, and the UE can successfully pass the CRC check when the CRC is scrambled by the right scrambling sequence. The scrambling sequence should be pre-defined and known to the UE, for example, the scrambling sequence can be an RNTI, such as, C-RNTI, P-RNTI, RA-RNTI or SI-RNTI.

In addition, the potential transport block can be encoded according to a pre-defined modulation and a coding scheme. For example, QPSK and ⅓ rate turbo code is pre-defined to the UE. Alternatively, the potential transport block may be encoded according to a selected modulation and a coding scheme from a pre-defined set. In this case, the UE needs to attempt all the possibilities to decode the potential transport block in the pre-defined set. It may increase the complexity for the UE. In addition, the redundancy version is also pre-defined. It can be fixed to a certain value or related to a user ID (e.g., RNTI). In one example, the redundancy version is related to the subframe number. In another example, for the case of the aggregating TBEs from different subframes, the redundancy version can be the same in different subframes. Therefore, the UE can simply combine the signals from different subframes and attempt to detect the TBEs after a certain time of combination.

Figure 7A:
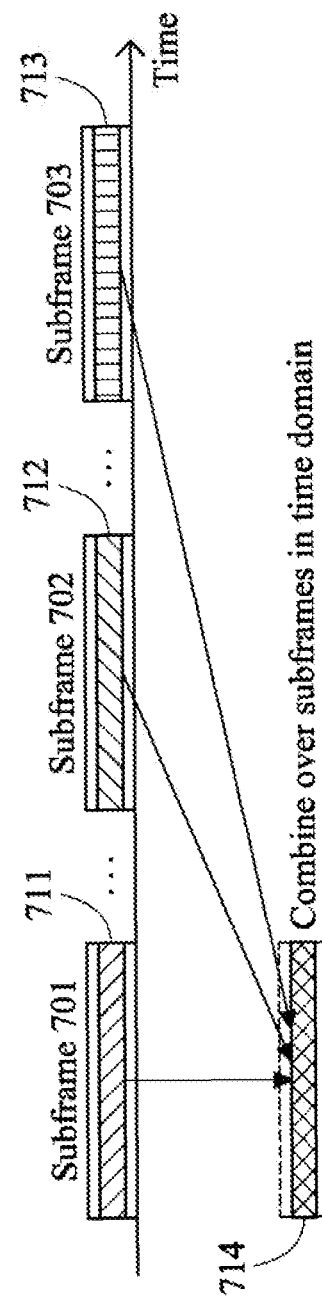
FIGS. 7A~7C illustrate examples of combination methods.
Figure 7B:
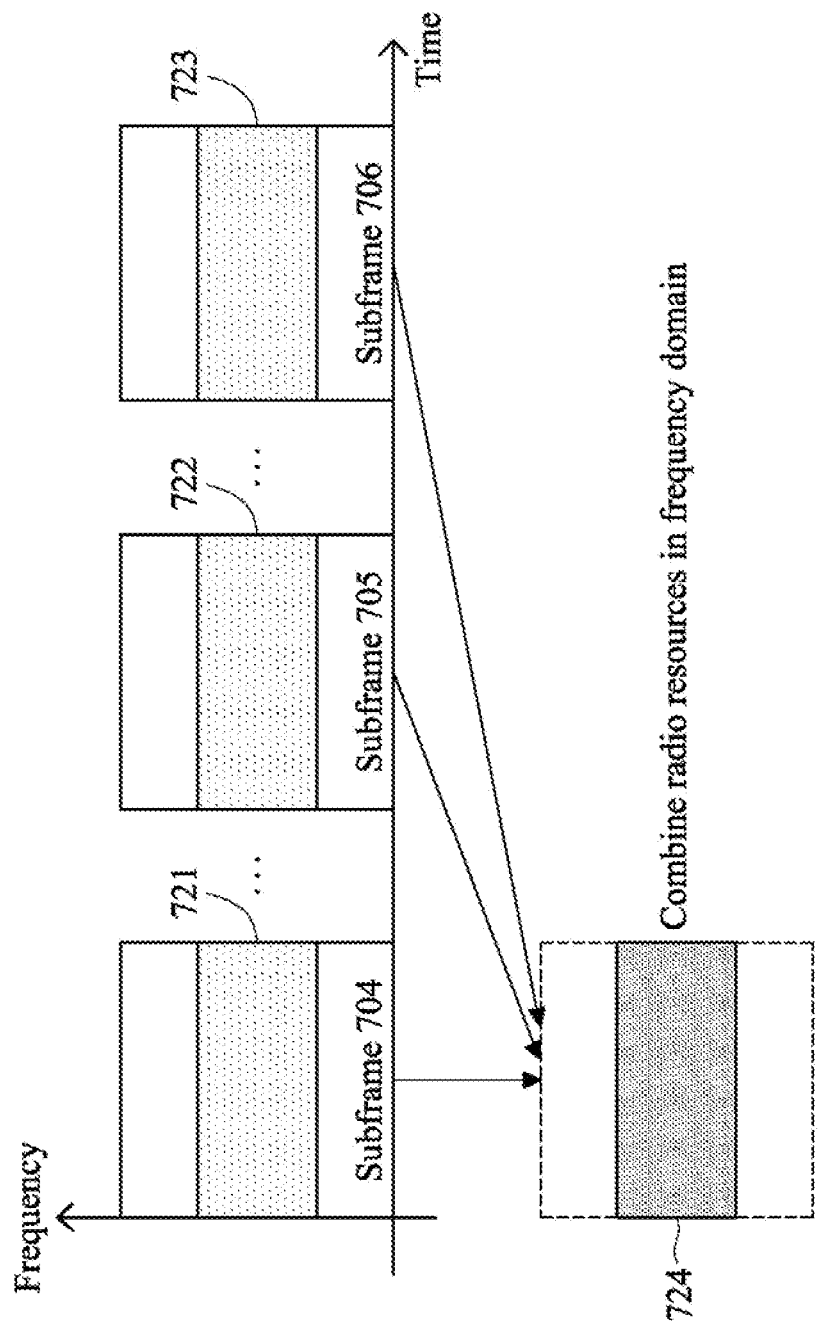
Figure 7C:
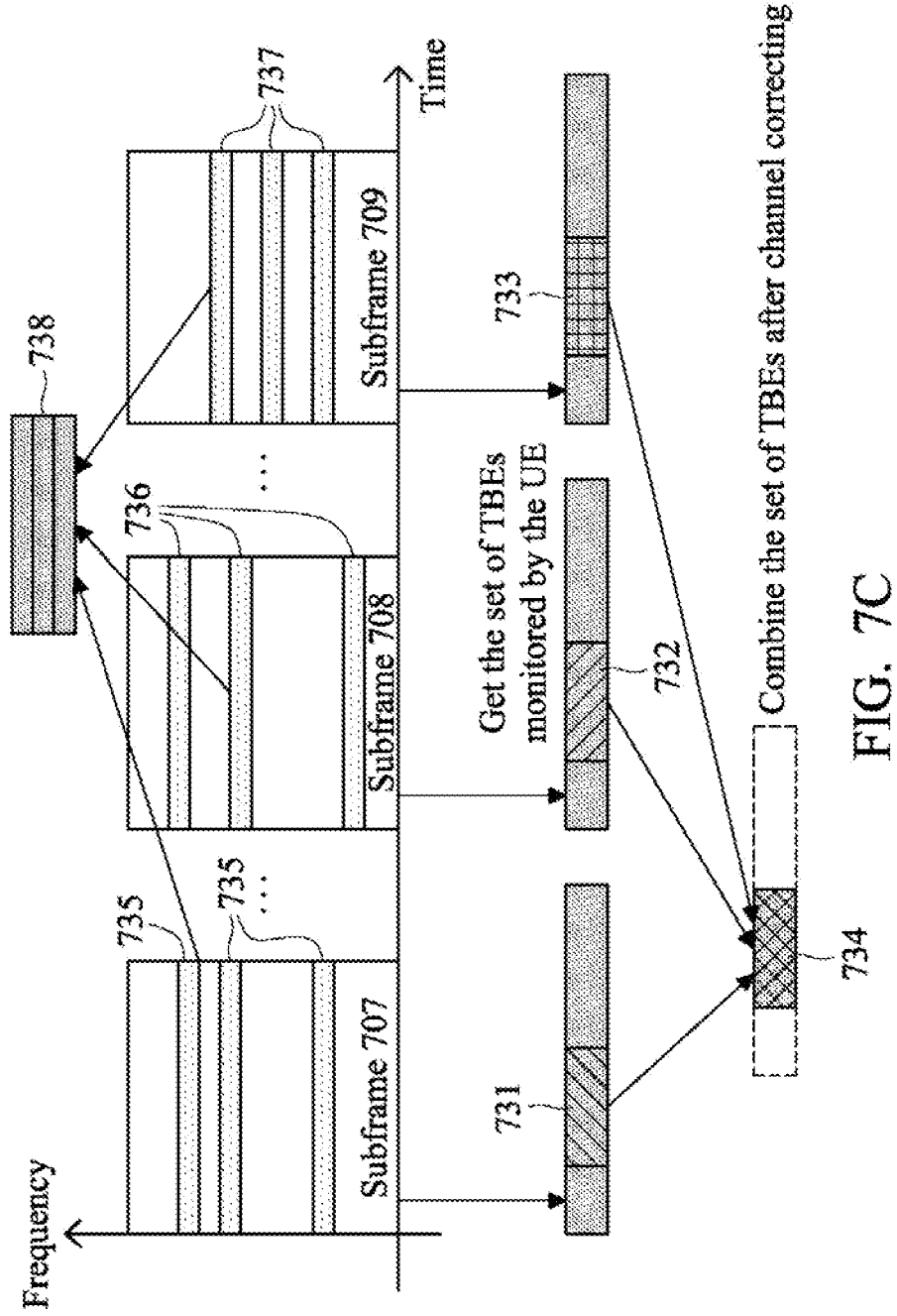

In different subframes, the symbols in the radio resources are the same if the same coding (also the same redundancy version) and modulation in different subframes are used. As a result, the UE can simply combine the symbols from the different subframes. Referring to FIGS. 7A-7C, some examples of combination are further described. One example of combination is illustrated in FIG. 7A, wherein the received time domain samples in each subframe 701, 702 and 703 are directly combined and the radio resources 711, 712 and 713 in these subframes are combined to 714. Another example of combination in FIG. 7B illustrates that the UE combines the received frequency samples over the subframes 704, 705 and 706 and the radio resources 721, 722 and 723 in these subframes are combined to 724. For the above two combining implementations, the reference signals can also be combined. Combining the reference signals would be beneficial to increase SNR and obtain better channel estimation if the channel does not change significantly between different subframes. FIG. 7C illustrates another example for combination, wherein same or different sets of the transport block resources 735, 736 and 737 can be used in each subframe. After transforming the signals into the frequency domain and correcting the channel effect, the UE can combine the sets of radio resources from different subframes. For example, after correcting the channel effect, the UE may combine TBEs 731, 732 and 733 into a combined radio resource 734. Alternatively, the UE can combine the radio resources 735, 736 and 737 into an aggregated set of TBEs 738.

Another alternative is that different subframes are used according tp different redundancy versions. The redundancy version for the starting subframe can be pre-defined and increase the index for the following subframes. For example, the sequence of the redundancy versions is 0, 2, 3 and 1. The UE may determine the index of the sequence and then get the redundancy version according to a subset of the set the subframe index, user ID and cell ID.

The transmission mode shall also be pre-defined, for example, by using transmission diversity. Other transmission mode can be supported, such as open loop or close loop beamforming. The transmission mode can be configured to the UE by the base station. Alternatively, the UE can blindly detect the transport block for more than one transmission mode in a given set.

The transport block size (TBS) of a transport block is also pre-defined. In LTE system, the transport block size of the transport block is pre-defined in a table and the index is indicated by the MCS in the control channel. For control channel blind detection, the payload size can be calculated based on a pre-defined rule for each DCI format (e.g., the payload size is changed for different bandwidth and TDD or FDD). In order to decode the transport block candidate, the UE needs to know the transport block size of the candidate transport block. The UE can blindly detect the candidate transport block within a pre-defined set of transport block size. Alternatively, the TBS can be fixed or be calculated according to the pre-defined rule.

Table 2 shows an example, wherein for each TBS index, the transport block size is given for each aggregation level (i.e., the TBE number). For TBS index 0, the transport block size is fixed to 16 bits. More resources can be allocated for this small transport block size to provide a better coverage. For example, a UE in a coverage hole can be configured to blindly decode the transport block for the aggregation level {16, 32, 64, 128} with TBS index 0. For TBS index 7, the transport block size increases with the aggregation level to be suitable for the UE having better channel condition. More bits can be transmitted within one transport block according to TBS index 7. The UE can be configured to monitor for more than one TBS index. The blind decoding attempts and complexity may be increased but the base station has more flexibility. Another simple example is that a TBS set is pre-defined such as {16, 32, 64} and the UE needs to blindly decode each TBS.

TABLE 2

An example of transport block size

| TBS index | TBE (transport block element) number (Aggregation level) | | | | | | | |
|---|---|---|---|---|---|---|---|---|
| 0 | 1 | 2 | 4 | 8 | 16 | 32 | 64 | 128 |
| 1 | 16 | 16 | 16 | 16 | 16 | 16 | 16 | 16 |
| 2 | 16 | 32 | 32 | 32 | 32 | 32 | 32 | 32 |
| 3 | 16 | 32 | 56 | 56 | 56 | 56 | 56 | 56 |
| 4 | 16 | 32 | 56 | 72 | 72 | 72 | 72 | 72 |
| 5 | 16 | 32 | 56 | 72 | 104 | 104 | 104 | 104 |
| 6 | 16 | 32 | 56 | 72 | 104 | 120 | 120 | 120 |
| 7 | 16 | 32 | 56 | 72 | 104 | 120 | 136 | 136 |

An operational design example following the above method is described here. In an example, the repetition in 2, 4, 8, 16, 32, 64, or 128 subframes can achieve a varying degree of gain over a single-frame transmission with a maximum of 21 dB. A simple repetition of the transmitted signal, instead of incremental redundancy, can be used to achieve a reduced code rate, because the UE is allowed to combine/accumulate over subframes. In this case of combining/accumulating over subframes, the use rate of the buffer is better than only a single subframe. The repetition across subframes may be triggered when a maximum aggregation level in frequency domain is reached. It is reasonable since the frequency domain aggregation is exploited to overcome the low SNR and the time-domain accumulation is used only when the frequency domain aggregation is insufficient. The transport block size in a transport block can also be pre-defined. Different transport block sizes are defined corresponding to the radio resources occupied in the candidate transport block. A fixed MCS, such as QPSK rate 1/3, is used to monitor the turbo code. For the repetition case, the starting subframe is also previously known to the UE. A well-defined starting subframe can be beneficial to reduce the UE blind decoding time and the complexity. With known frequency domain aggregation and the fixed MCS, only the following parameters are blindly decoded at the UE:

Subframe repetition level: the set {2, 4, 8, 16, 32, 64, 128} or a subset of the set. The subframe repetition level may be determined by the UE based on the estimated path loss of the UE (also known to the base station via the RACH preamble used by the UE) Location of the resources in the frequency domain in each subframe. The location may be located among a set of candidate locations known to the UE based on, for example, the user ID of the UE (e.g., RNTI).

In another operational design example, the modulation order is fixed to QPSK, and the PRB numbers in each subframe is pre-defined, e.g., 6 PRBs in each subframe. Furthermore, the resource allocation of the transport block in each subframe is previously known to the UE. Alternatively, the transport block is transmitted in some pre-defined sets of radio resources and the UE needs to blind detect the transport block. The TBS is pre-defined to one or multiple candidate values. Coding scheme is 1/3 turbo by using transmit diversity. Different RNTIs are scrambled to CRC so that the UE can check whether the transport block is intended for it. In addition, different RNTIs are used to differentiate common channels or uni-cast channels, for example, CRC is scrambled with SI-RNTI, P-RNTI, RA-RNTI for SIB, Paging and RAR, respectively. The UE uses different RNTI to differentiate different channels. In repetition case, the starting subframe is previously known to UE. The repetition number may be also known to UE. Alternatively, the UE may need to blind detect for a pre-know repetition levels.

The UE may attempt to decode each candidate transport block per search space of the UE. The transport block signal cannot be changed during the repetition, but the UE may successfully decode the transport block before the end of the retransmission. In this case, the base station may allow the UE to acknowledge the transport block reception. However, the base station does not know when the UE starts to transmit the ACK signal. The base station may allow the ACK to be sent only after all retransmissions. The number of retransmissions can be explicitly or implicitly included in the transport block. Note that transport block can either be decoded successfully (ACK) or not detected which results in no transmission (i.e., DTX). There is no NACK in this case.

As mentioned above, the transport block can contain not only the data traffic, but also the control information. The control information contained in the transport block may also include the indication of the uplink transmission such as the power and the uplink radio resources allocated for the ACK or data if the UE also has UL traffic for sending to the base station. In some cases, e.g., uplink scheduling, the transport block may not contain downlink data and only contain the control information for uplink. In addition, the transport block may also contain system information. The UE decodes the transport block carrying system information by checking a pre-defined CRC, for example, CRC scrambled by SI-RNTI can be used to transmit the system information.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for decoding a transport block, used in an UE, comprising:

receiving a first transmission of a first candidate transport block out of a plurality of transmissions of multiple candidate transport blocks, wherein the first candidate transport block occupies a first set of data radio resources in a first subframe in a time domain on a downlink channel;

receiving a second transmission of a second candidate transport block out of the plurality of transmissions of the multiple candidate transport blocks, wherein the second transmission is a first retransmission of the first transmission of the first candidate transport block, wherein the second candidate transport block occupies a second set of data radio resources in a second subframe that is subsequent to the first subframe in the time domain on the downlink channel, wherein the second transmission is transmitted without any retransmission request for the first transmission; and decoding the first candidate transport block based on a combination of the first transmission and the second transmission according to pre-defined encoding information to detect a potential transport block intended for the UE, wherein the pre-defined encoding information includes at least one of a modulation and a coding scheme, CRC scrambling information, a transmission mode, and a transport block size (TBS).

2. The method of claim 1, wherein the first and second sets of data radio resources corresponding to multiple candidate transport blocks are pre-defined and known to the UE.

3. The method of claim 1, wherein the first and second sets of data radio resources for the multiple candidate transport blocks are overlapping or non-overlapping.

4. The method of claim 1, wherein each candidate transport block is aggregated by at least one transport block element according to an aggregation level.

5. The method of claim 4, wherein the at least one transport block element of the candidate transport block spans at least one subframe.

6. The method of claim 5, wherein the at least one subframe for the candidate transport block is configured by higher layer.

7. The method of claim 5, wherein a valid starting subframe of the at least one subframe is previously known to the UE according to a predetermined rule.

8. The method of claim 4, wherein the transport block element is comprised of resource elements from a part of or an entire physical resource block.

9. The method of claim 4, wherein the transport block element is comprised of resource elements from multiple physical resource blocks.

10. The method of claim 1, wherein the potential transport block includes control information.

11. The method of claim 10, wherein the control information is physical-layer related control information.

12. The method of claim 10, wherein the control information includes at least one of a Sounding Reference Signal (SRS) request, transmit power control (TPC) command, and downlink assignment index (DAI).

13. The method of claim 10, wherein the control information includes scheduling information of uplink transmission.

14. The method of claim 13, wherein the scheduling information of the uplink transmission includes at least one of a resource block assignment, transmit power control (TPC) command scheduled for uplink transport block, cyclic shift for demodulation reference signal (DMRS) and orthogonal covering code (OCC) index, UL index, downlink assignment index (DAI), and Channel Status Indicator (CSI) request.

15. The method of claim 1, wherein the potential transport block includes system information.

16. The method of claim 15, wherein the UE decodes for the potential transport block including system information by checking a CRC scrambled with a pre-defined RNTI.

17. The method of claim 15, wherein the potential transport block includes an indicator to separate control information and traffic data.

18. The method of claim 17, wherein the control information is included in some pre-defined subframes.

19. The method of claim 1, further comprising:
sending, on an uplink radio resource, an acknowledgment signal to a base station when the potential transport block is successfully decoded.

20. The method of claim 19, wherein a location of the uplink radio resource is determined from the first and second sets of data radio resources on which the potential transport block is detected.

21. The method of claim 19, wherein a location of the uplink radio resource is indicated in the decoded transport block.

22. The method of claim 1, further comprising:
receiving a third transmission of a third candidate transport block out of the plurality of transmissions of the multiple candidate transport blocks, wherein the third transmission is a second retransmission of the first transmission of the first candidate transport block, wherein the third candidate transport block occupies a third set of radio resources in a third subframe that is subsequent to the second subframe in the time domain on the downlink channel, wherein the third transmission is transmitted without any retransmission request for the first transmission and second transmission; and
decoding the first candidate transport block based on a combination of the first transmission, the second transmission, and the third transmission according to the pre-defined encoding information to detect the potential transport block intended for the UE.

* * * * *